United States Patent
Na et al.

(10) Patent No.: US 11,475,186 B2
(45) Date of Patent: Oct. 18, 2022

(54) APPARATUS AND METHOD FOR DERIVING BOILER COMBUSTION MODEL

(71) Applicant: DOOSAN ENERBILITY CO., LTD., Changwon-si (KR)

(72) Inventors: Sang Gun Na, Yongin-si (KR); Jwa Young Maeng, Yongin-si (KR)

(*) Notice: Subject to any disclaimer, the term of this patent is extended or adjusted under 35 U.S.C. 154(b) by 386 days.

(21) Appl. No.: 16/808,360

(22) Filed: Mar. 3, 2020

(65) Prior Publication Data

US 2020/0320237 A1    Oct. 8, 2020

(30) Foreign Application Priority Data

Apr. 8, 2019    (KR) .................. 10-2019-0040955

(51) Int. Cl.
| | |
|---|---|
| *G06F 30/27* | (2020.01) |
| *G06N 3/04* | (2006.01) |
| *G06F 30/28* | (2020.01) |
| *G06F 111/10* | (2020.01) |

(52) U.S. Cl.
CPC .............. *G06F 30/27* (2020.01); *G06F 30/28* (2020.01); *G06N 3/04* (2013.01); *G06F 2111/10* (2020.01)

(58) Field of Classification Search
CPC ...... G06F 30/27; G06F 30/28; G06F 2111/10; G06N 3/04; G06N 3/08; G06N 20/00; F22B 35/18
See application file for complete search history.

(56) References Cited

U.S. PATENT DOCUMENTS

2017/0017212 A1*  1/2017  Collins ............... G05B 13/027

FOREIGN PATENT DOCUMENTS

| JP | 2007-264796 A | 10/2007 |
|---|---|---|
| JP | 2007-271187 A | 10/2007 |
| KR | 1998-0051203 A | 9/1998 |
| KR | 2014-0050123 A | 4/2014 |
| KR | 10-1810968 B1 | 12/2017 |
| KR | 1810968 B1 * | 12/2017 |

OTHER PUBLICATIONS

Guoqiang Li, et al., "Circular convolution parallel extreme learning machine for modeling boiler efficiency for a 300 MW CFBB," Soft Computing 23:6567-6577 (Year: 2018).*
Guoqiang Li et al., "Tuning extreme learning machine by an improved artificial bee colony to model and optimize the boiler efficiency," Knowledge-Based Systems 67 (2014) 278-289 (Year: 2014).*

* cited by examiner

*Primary Examiner* — Steven W Crabb
(74) *Attorney, Agent, or Firm* — Harvest IP Law, LLP (57) ABSTRACT

A method of and an apparatus for deriving a boiler combustion model by setting input and output data and using a combination of mathematical models including an artificial neural network (ANN) are provided. The method of deriving a boiler combustion model may include setting input and output data required for derivation of a boiler combustion model, deriving a boiler combustion model including an input layer configured to receive the input data, a hidden layer including multiple nodes configured to perform computation on the input data, and an output layer configured to output a computation result transferred from the hidden layer as the output data, and determining a precision of the derived boiler combustion model.

19 Claims, 4 Drawing Sheets

APPARATUS AND METHOD FOR DERIVING BOILER COMBUSTION MODEL

CROSS REFERENCE TO RELATED APPLICATION

This application claims priority to Korean Patent Application No. 10-2019-0040955, filed on Apr. 8, 2019, the entire disclosure of which is incorporated herein by reference in its entirety.

BACKGROUND

Field

Apparatuses and methods consistent with exemplary embodiments relate to an apparatus and method for deriving a boiler combustion model and more particularly, to an apparatus and method for deriving a boiler combustion model by setting input and output data and using mathematical models including an artificial neural network (ANN).

Description of the Related Art

Boilers in coal-fired power plants use exothermic reactions occurring in coal burning to heat water and produce steam for power generation. During this process, pollutant such as exhaust gas containing nitrogen oxide undesirably occurs. When an amount of the pollutant such as exhaust gas increases, the cost for treating the pollutant such as exhaust gas accordingly increases. Furthermore, when incomplete combustion of coal takes place, the combustion efficiency is reduced, resulting in increases in power generation cost and power plant operation cost. Therefore, there is a demand for a boiler combustion optimization apparatus for reducing the generation of pollutant such as exhaust gas while increasing combustion efficiency.

SUMMARY

Aspects of one or more exemplary embodiments provide an apparatus and method for deriving a boiler combustion model by setting input and output data and using mathematical models including an artificial neural network (ANN).

Additional aspects will be set forth in part in the description which follows and, in part, will become apparent from the description, or may be learned by practice of the exemplary embodiments.

According to an aspect of an exemplary embodiment, there is provided a method of deriving a boiler combustion model, the method including: setting input and output data required for a boiler combustion model; deriving a boiler combustion model including an input layer configured to receive the input data, a hidden layer including multiple nodes configured to perform computation on the input data, and an output layer configured to output a computation result transferred from the hidden layer as the output data; and determining precision of the derived boiler combustion model.

The input data may include a flow rate of feed water, a pressure and a temperature of the feed water, a flow rate of combustion air, a pressure and a temperature of the combustion air, and an amount and a composition of fuel. The input data may further include data on coal, data on bias dampers, data on loads, data on secondary air dampers, data on an overall plant, data on overfire air (OFA), data on wind boxes (WB), and data on air.

The output data may include a flow rate of steam, a pressure and a temperature of the steam, a temperature and a composition of exhaust gas, and a flow rate and a temperature of spray liquid for cooling the steam. The output data may further include data on combustion gas, data on the loads, data on reheaters, and data on superheaters.

The hidden layer may include 1 to 30 hidden layers and each of the hidden layers may include 1 to 5000 nodes.

The boiler combustion model may include a combination of mathematical models including an artificial neural network (ANN). An activation function of the artificial neural network (ANN) may include a linear function, a step function, a sigmoid function, and a rectified linear unit (ReLU) function. The mathematical model may include a transfer function model, a state space model, and an impulse/step response model.

The deriving of the boiler combustion model may include deriving a network-based (NN-based) boiler combustion model by learning from computational fluid dynamics (CFD) data of a plant. The NN-based boiler combustion model may include an input layer including 101 nodes, two hidden layers each of which includes 54 nodes, and an output layer including 264 nodes.

The deriving of the boiler combustion model may include deriving a network-based (NN-based) boiler combustion model by learning from actual grid data of a plant. The NN-based boiler combustion model may include an input layer including 116 nodes, four hidden layers each of which includes 15 nodes, and an output layer including 194 nodes.

In response to determining that the boiler combustion model is an optimal boiler combustion model, the method may further include storing the boiler combustion model in a database.

If a storage space of the database is insufficient, the storing of the boiler combustion model in the database may include storing the boiler combustion model in the database after deleting an optimal boiler combustion model having the lowest cumulative precision among optimal boiler combustion models stored in the database.

According to an aspect of another exemplary embodiment, there is provided a non-transitory computer readable storage medium storing a computer program comprising instructions for performing the method of deriving the boiler combustion model.

According to an aspect of another exemplary embodiment, there is provided an apparatus for deriving a boiler combustion model, the apparatus including: an input/output setting device configured to set input data and output data for a boiler combustion model; a model deriver configured to derive a boiler combustion model including an input layer configured to receive the input data, a hidden layer including multiple nodes configured to perform computation on the input data, and an output layer configured to output a computation result transferred from the hidden layer as the output data; and a precision determiner configured to determine a precision of the derived boiler combustion model.

The input data may include a flow rate of feed water, a pressure and a temperature of the feed water, a flow rate of combustion air, a pressure and a temperature of the combustion air, and an amount and a composition of fuel. The input data may further include data on coal, data on bias dampers, data on loads, data on secondary air dampers, data on an overall plant, data on overfire air (OFA), data on wind boxes (WB), and data on air.

The output data may include a flow rate of steam, a pressure and a temperature of the steam, a temperature and a composition of exhaust gas, and a flow rate and a temperature of spray liquid for cooling the steam. The output data may further include data on combustion gas, data on the loads, data on reheaters, and data on superheaters.

The hidden layer may include 1 to 30 hidden layers and each of the hidden layers may include 1 to 5000 nodes.

The boiler combustion model may include a combination of mathematical models including an artificial neural network (ANN). An activation function of the artificial neural network (ANN) may include a linear function, a step function, a sigmoid function, and a rectified linear unit (ReLU) function. The mathematical model may include a transfer function model, a state space model, and an impulse/step response model.

The model deriver may derive a network-based (NN-based) boiler combustion model by learning from computational fluid dynamics (CFD) data of a plant. The NN-based boiler combustion model may include an input layer including 101 nodes, two hidden layers each of which includes 54 nodes, and an output layer including 264 nodes.

The model deriver may derive a network-based (NN-based) boiler combustion model by learning from actual grid data of a plant. The NN-based boiler combustion model may include an input layer including 116 nodes, four hidden layers each of which includes 15 nodes, and an output layer including 194 nodes.

The apparatus for deriving the boiler combustion model may further include a database configured to store the boiler combustion model, and in response to determining that the boiler combustion model is an optimal boiler combustion model, the database may store the boiler combustion model.

If a storage space of the database is insufficient, the database may store the boiler combustion model after deleting an optimal boiler combustion model having the lowest cumulative precision among optimal boiler combustion models stored in the database.

The method and apparatus for deriving a boiler combustion model according to exemplary embodiments can derive a boiler combustion model for optimizing the combustion of a boiler.

In addition, by deriving a boiler combustion model for optimizing the combustion of a boiler, it is possible to increase the combustion efficiency of the boiler, reduce the exhaust gas, and reduce the cost.

BRIEF DESCRIPTION OF THE DRAWINGS

The above and other aspects will be more apparent from the following description of the exemplary embodiments with reference to the accompanying drawings, in which.

DETAILED DESCRIPTION

Various modifications and various embodiments will be described in detail with reference to the accompanying drawings so that those skilled in the art may easily implement the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

The functional blocks illustrated in the drawings and described below are only examples of possible implementations. Other functional blocks may be used in other implementations without departing from the spirit and scope of the detailed description. Also, while one or more functional blocks of the present disclosure are represented by separate blocks, one or more of the functional blocks may be a combination of various hardware and software configurations that perform the same function.

Also, "a module" or "a part" in the disclosure perform at least one function or operation, and these elements may be implemented as hardware or software, or as a combination of hardware and software. Further, a plurality of "modules" or "parts" may be integrated into at least one module and implemented as at least one processor, except "modules" or "parts" that need to be implemented as specific hardware.

The terminology used herein is for the purpose of describing specific embodiments only and is not intended to limit the scope of the disclosure. The singular expressions "a", "an", and "the" are intended to include the plural expressions as well, unless the context clearly indicates otherwise. When an element is referred to as being "on" another element, it can be directly on the other element or intervening elements may be present therebetween.

In the disclosure, the terms such as "comprise", "include", "have/has" should be construed as designating that there are such features, regions, integers, steps, operations, elements, components, and/or combinations thereof, not to exclude the presence or possibility of adding of one or more of other features, regions, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinbelow, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

Figure 1:
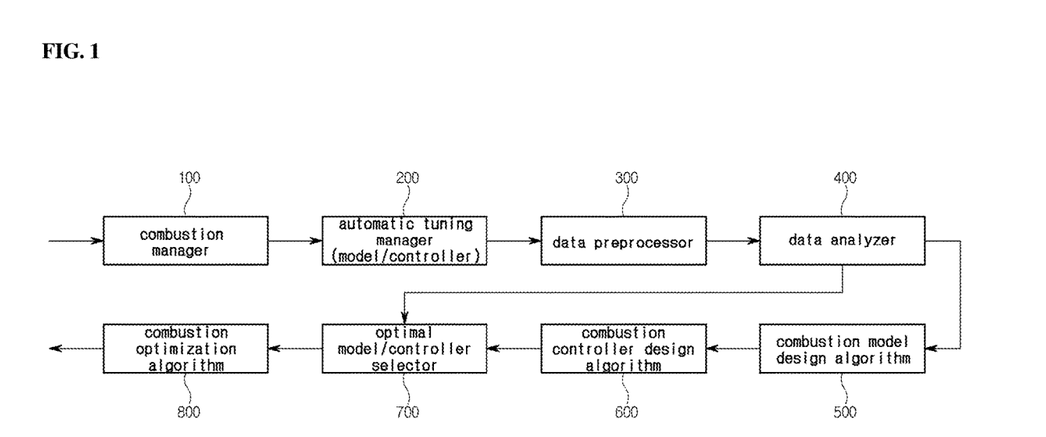
FIG. 1 is a diagram illustrating an apparatus for optimizing combustion of a boiler according to an exemplary embodiment.

FIG. 1 is a diagram illustrating an apparatus for optimizing combustion of a boiler according to an exemplary embodiment.

Referring to FIG. 1, the boiler combustion optimization apparatus may include a combustion manager 100, an automatic tuning manager 200, a data preprocessor 300, a data analyzer 400, a combustion model design algorithm 500, a combustion controller design algorithm 600, an optimal model/controller selector 700, and a combustion optimization algorithm 800.

The combustion manager 100 performs overall control of the apparatus for optimization of combustion. For example, the combustion manager 100 determines whether to perform combustion optimization based on tag data information measured or calculated in real time. In addition, when the combustion manager 100 is used in a power plant, the combustion manager 100 determines whether to perform combustion optimization based on distributed control system (DCS) values such as a generator output of a power plant, a change in output, a chute blower operation state, a boiler logic operation, and the like.

The automatic tuning manager 200 manages a combustion model and a combustion controller. For example, the automatic tuning manager 200 determines whether to tune the combustion model and the combustion controller based on information such as tag data information measured or calculated in real time, information of whether combustion optimization is performed, information of whether learning for tuning the model and the controller is performed, and the like. Here, the automatic tuning manager 200 activates the combustion model design algorithm 500 and the combustion controller design algorithm 600 if it is determined that the combustion model and the combustion controller need to be tuned. However, if it is determined that the combustion controller does not need to be tuned, the automatic tuning manager 200 does not activate the combustion model design algorithm 500 and the combustion controller design algorithm 600.

The data preprocessor 300 performs data preprocessing using tag data information measured or calculated in real time and tag data information stored in the database. For example, the data preprocessor 300 may perform signal processing, normal data processing (based on knowledge or data), and outlier processing. Through this processing, the data preprocessor 300 may remove data that has a negative effect on the removal of noise in the data, the generation of a combustion model, and on designing a controller.

The data analyzer 400 performs pattern analysis and sampling on data to select only important data obtained in a normal state required to design the combustion model and the combustion controller. Further, the data analyzer 400 selects input variables having a significant influence on a model output through correlation analysis to design the combustion model.

The combustion model design algorithm 500 refers to an algorithm used to design a combustion model which is one of the most important factors in optimizing the combustion of a boiler. The combustion model design algorithm 500 is used to design a combustion model which may predict important combustion parameters including a generator output, a combustion state including temperature of steam and exhaust gas, a composition of exhaust gas, and concentration of oxygen after combustion based on inputs including a feed rate of fuel, a feed rate of air, air temperature, a feed rate of water, water temperature, and the like.

The combustion model design algorithm 600 may be an algorithm used to design a combustion controller which is one of the most important factors in optimizing the combustion of a boiler. The combustion controller design algorithm 600 serves to make the combustion controller which is designed according to the combustion model to produce a labeled value (i.e., target value) for the optimal combustion.

The optimal model/controller selector 700 selects the optimal combustion model and the optimal combustion controller from among several candidates that are obtained in advance based on the analysis of the current data.

The combustion optimization algorithm 800 calculates optimal target values for the combustion optimization by inputting the current data to the optimal combustion model and the optimal combustion controller. In addition, the combustion optimization algorithm 800 calculates optimal control target values and associated auxiliary values by using target values in the current distributed control system (DCS) and a manual.

Here, the apparatus for deriving boiler combustion model according to an exemplary embodiment corresponds to the combustion model design algorithm 500. The apparatus sets input data and output data and derives a boiler combustion model by using a combination of mathematical models including an artificial neural network (ANN).

Figure 2:
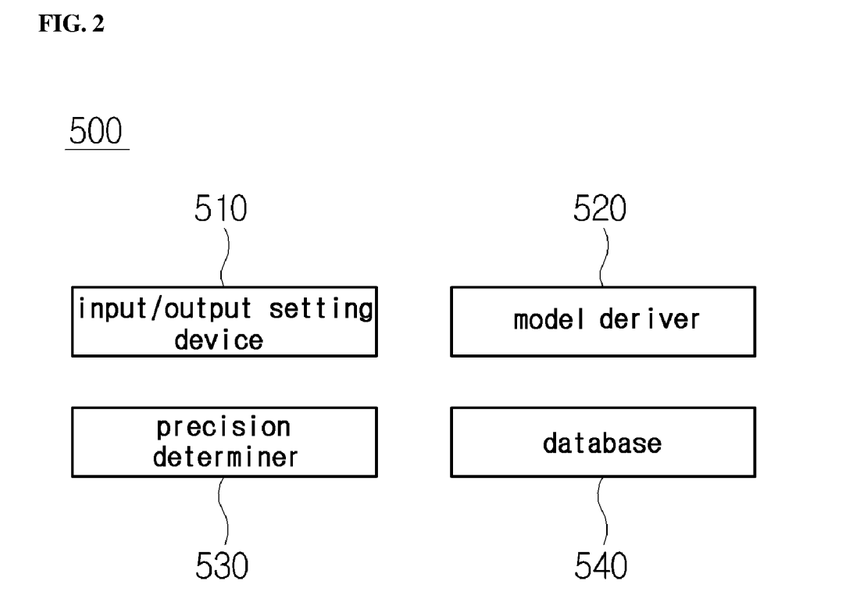
FIG. 2 is a diagram illustrating a construction of an apparatus for deriving a boiler combustion model according to an exemplary embodiment.

FIG. 2 is a diagram illustrating a construction of an apparatus for deriving a boiler combustion model according to an exemplary embodiment.

Referring to FIG. 2, the boiler combustion model derivation apparatus 500 may include an input/output setting device 510, a model deriver 520, a precision determiner 530, and a database 540. The input/output setting device 510, the model deriver 520, and the precision determiner 530 can be implemented as one or more processor configured to perform corresponding functions. For example, the one or more processor may be a CPU (central processing unit), MPU (micro processing unit), FPGA (field programmable gate array), MCU (micro controller unit), GPU (graphics processing unit), or ASIC (application specific integrated circuit), but not limited thereto.

The input/output setting device 510 sets input data and output data required for a boiler combustion model. The input data includes a flow rate of feed water, a pressure and temperature of the feed water, a flow rate of combustion air, a pressure and temperature of the combustion air, an amount and composition of fuel, and the like. The input/output setting device 510 sets one type of the data or multiple types of the data as input data. For example, the input data may include data relating to coal (e.g., data of feeder flow or data of a flame scanner), data relating to a bias damper (e.g., flue gas bias damper POS), data relating to load (e.g. reference, local set point, etc.), data relating to secondary air (SA) damper (e.g., damper POS), data relating to overall operation of a plant (e.g., air flow, feed water flow, feed water temperature), data relating to OFA (e.g., UOFA damper POS), data relating to wind box (WB) (e.g., wind box pressure), and data relating to air (e.g., forced draft (FD) fan inlet air temperature).

In addition, the output data may include the flow rate, pressure, and temperature of steam, the temperature and composition of exhaust gas, the flow rate and temperature of spray liquid for cooling. The input/output setting device 510 may set one type of the data or multiple types of the data as output data. For example, the output data may include data on combustion gases (e.g., CO, flow rate, NOx, O2, pressure, SOx, temperature), data on loads (e.g., boiler, turbine, and plant), data on reheaters (e.g., spray liquid flow rate, steam temperature), and data on superheaters (e.g., spray liquid flow rate, steam pressure, and steam temperature).

The model deriver 520 derives a boiler combustion model including an input layer for receiving input data, a hidden layer including a plurality of nodes for performing computation on the input data, and an output layer for outputting the computation result transferred from the hidden layer as output data.

The boiler combustion model derived by the model deriver 520 may be an artificial intelligence (AI)-based model. Depending on exemplary embodiments, the boiler combustion model may be a machine learning based model. That is, the boiler combustion model may be an artificial neural network (ANN)-based model.

The boiler combustion model may be a combination of mathematical models including a neural network. Activation functions of the artificial neural network (ANN) may include a linear function, a step function, a sigmoid function, and a rectified linear unit (ReLU) function. The mathematical models may include a transfer function model, a state space model, and an impulse/step response model. For example, only a single mathematical model may be used or multiple mathematical models may be combined in series or in parallel. Depending on exemplary embodiments, an MLP (Multilayer Perceptron) single model may include two hidden layers.

According to an exemplary embodiment, the boiler combustion model may include an input layer, a hidden layer, and an output layer. Each of the layers may include multiple nodes.

The input layer is a layer to receive input values of predictor variables used to derive a predictive value. According to an exemplary embodiment, the input layer may receive the input data set by the input/output setting device 510 as the predictor variables. The number of nodes of the input layer may vary depending on the number of pieces of the input data. That is, if the number of pieces of the input data is n, the input layer may include n nodes.

The hidden layer receives the input data from the input layer, calculates a weighted sum, applies the calculated weighted sum to a function, and transfers the output of the function to the output layer. Here, the hidden layer may receive input data from all the nodes of the input layers, and the nodes of the input layers and the nodes of the hidden layers may be connected via networks having different weights.

Here, the number of the hidden layers may be 1 to 30, and the number of nodes in each hidden layer may be 1 to 5000.

The output layer may receive the results of the computations on the input data from the hidden layers and output the output data. Here, the output layer may receive data from all the nodes of the hidden layers, and the nodes of the hidden layers and the nodes of the output layers may be connected via networks having different weights.

The model deriver 520 may derive a boiler combustion model configured with the input layer, the hidden layer, and the output layer. That is, the model deriver 520 derives a boiler combustion model so that data set by the input/output setting device 510 is input to the input layer and transferred to the hidden layer at which the input data is processed, results of the processing performed on the input data are transferred to the output layer, and data output from the output layer serves as output data.

The precision determiner 530 may determine a precision of the derived boiler combustion model. If the precision determiner 530 determines that the precision of the derived boiler combustion model is higher than that of a preset precision level, the derived boiler combustion model may be selected as an optimal boiler combustion model. If the precision determiner 530 determines that the precision of the derived boiler combustion model is higher than that of an optimal boiler combustion model stored in the database 540, the derived boiler combustion model is set as an optimal boiler combustion model.

For example, the model deriver 520 may derive a neural network-based (NN-based) boiler combustion model using data (hereinafter, referred to as CFD data) that is based on computational fluid dynamics (CFD). That is, the model deriver 520 may derive the NN-based boiler combustion model by learning from CFD data of the plant. In this case, the model deriver 520 may derive a boiler combustion model configured with an input layer including 101 nodes, two hidden layers each of which includes 54 nodes, and an output layer including 264 nodes.

Alternatively, the model deriver 520 may derive an NN-based boiler combustion model using real data. That is, the model deriver 520 may derive the NN-based boiler combustion model by learning from actual grid data of the plant. In this case, the model deriver 520 may derive a boiler combustion model configured with an input layer including 116 nodes, 4 hidden layers each of which includes 26 nodes, and an output layer including 194 nodes.

The database 540 may store boiler combustion models. The boiler combustion model derived by the model deriver 520 may be input to the database 540, and a fixed boiler combustion model and an optimal model boiler combustion model may be stored in the database 540.

The fixed model (hereinafter, referred to as model root) may be a combustion model generated based on power plant operation data collected for a period of 1 month to 10 years. That is, the fixed model is a boiler combustion model that is trained using long term data and the performance of which is confirmed. The fixed model may be input to the database 540 by a specific user and cannot be changed or deleted unless the specific user arbitrarily changes it. The fixed model may be the basis for a boiler combustion model to be derived by the model deriver 520. That is, the model deriver 520 may derive a boiler combustion model based on the structure of the fixed model.

The optimal model (hereinafter, referred to as model fruit) may be a combustion model that has been previously selected as an optimal boiler combustion model. The database 540 may contain the model fruits arranged in order of being determined as the optimal model. Accordingly, the database 540 may have a hierarchical structure in which the model fruits are sequentially stored in respective layers from the highest layer to the lowest layer in an order being determined as the optimal boiler combustion model.

If the boiler combustion model derived by the model deriver 520 is selected as the optimal boiler combustion model, the derived boiler combustion model may be stored in the database 540.

Here, the database 540 may store the derived boiler combustion model if an available storage space is remained in the database 540. However, if the storage space is insufficient, the database 540 may delete one of the optimal models stored in the database 540 and store the derived boiler combustion model. Here, the database 540 may delete the optimal model having the lowest cumulative precision among the stored optimal models. Alternatively, if the cumulative precision of the optimal model having the lowest optimal model among the optimal models stored in the database 540 is higher than the precision of the derived boiler combustion model, the derived boiler combustion model may not be stored.

Figure 3:
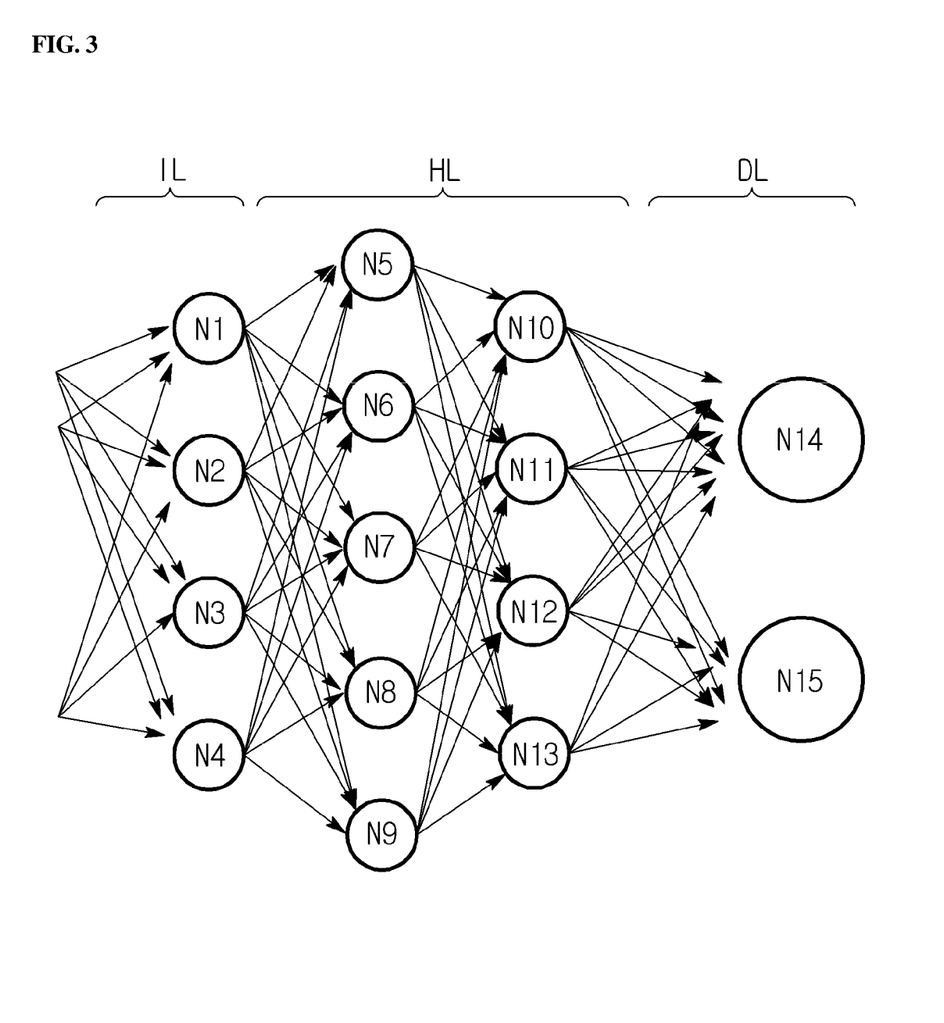
FIG. 3 is a diagram illustrating a boiler combustion model derivation process according to an exemplary embodiment.

FIG. 3 is a diagram illustrating a boiler combustion model derivation process according to an exemplary embodiment.

Referring to FIG. 3, a boiler combustion model BM derived by the model deriver 520 may include three types of layers. The boiler combustion model BM includes an input layer IL including first nodes N1 to N4, a hidden layer HL including second nodes N5 to N13, and an output layer OL including third nodes N14 to N15. FIG. 3 illustrates a case in which the boiler combustion model BM includes the layers IL, HL and OL and nodes N1 to N15 included in the layers IL, HL and OL, but it is understood that this is only an example and other exemplary embodiments are not limited thereto.

The layers included in the boiler combustion model BM may not be physical layers but should be construed as a set of functions or a set of instructions classified by functions.

The input layer IL may receive input data and transfer the received input data to the hidden layer HL. Depending on exemplary embodiments, the input layer IL receives, as an input, the flow rate, pressure, and temperature of feed water, or the flow rate, pressure, and temperature of combustion air, or the amount or composition of fuel, and transfers the received input to the hidden layer HL.

The hidden layer HL may perform computation using the flow rate, pressure, and temperature of feed water, or the flow rate, pressure, and temperature of combustion air, or the amount or composition of fuel. Depending on exemplary embodiments, the hidden layer HL may generate an output with respect to the transferred input based on a weight and a bias. For example, the weight and bias of the hidden layer HL may refer to a priority and a significance of each of the flow rate, pressure, and temperature of the feed water, the flow rate, pressure, and temperature of the combustion air, and the amount or composition of the fuel. Accordingly, the model deriver 520 may derive a boiler combustion model that produces the output data with respect to the input data.

The output layer OL may receive the output data from the hidden layer HL and calculate a predictive value by using an operation result transferred from the hidden layer HL. Depending on exemplary embodiments, the output layer OL may receive the flow rate, pressure, or temperature of steam, the temperature or composition of exhaust gas, or the flow rate or temperature of cooling spray liquid, and may output the received output data as a predictive value.

The model deriver 520 according to an exemplary embodiment may construct an input layer IL configured to receive input data, a hidden layer HL configured to process the input data received from the input layer IL and to transfer resulting data of the processing to an output layer OL, and the output layer OL configured to receive output data from the hidden layer HL and to output a prediction result.

Figure 4:
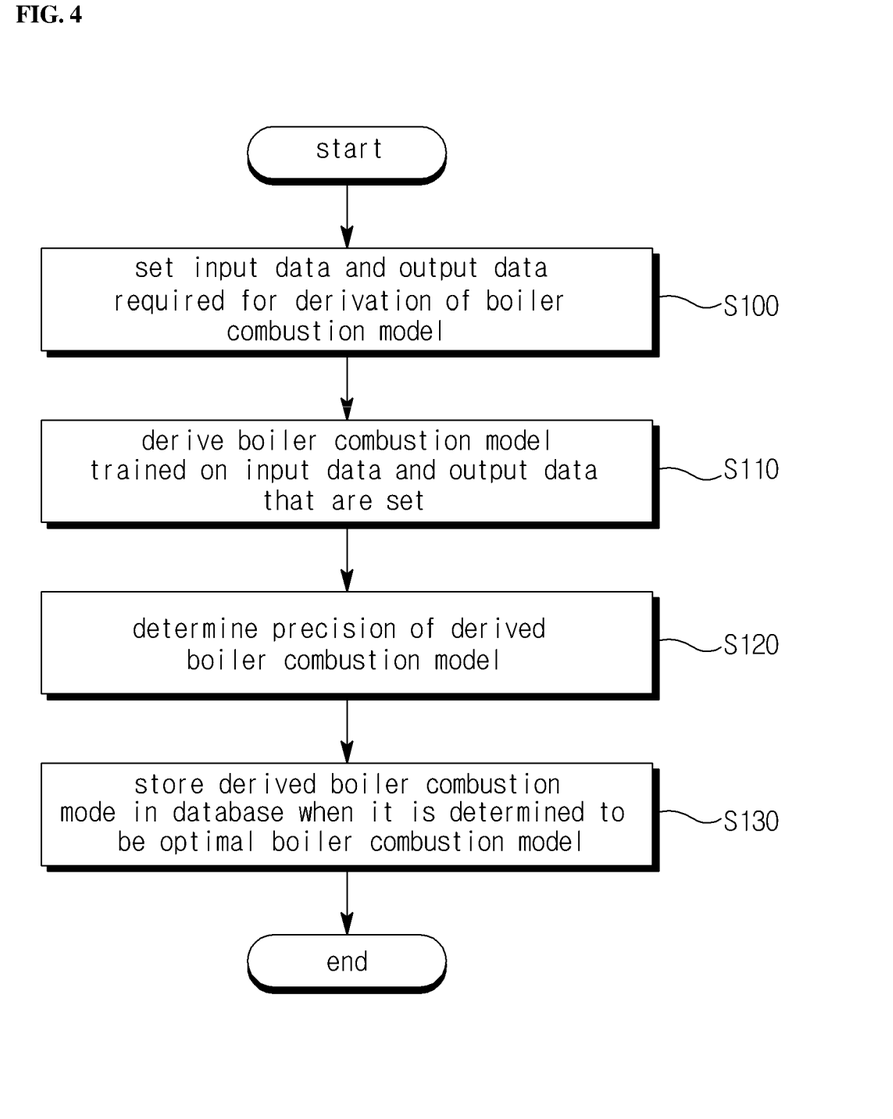
FIG. 4 is a flowchart illustrating a method of deriving a boiler combustion model according to an exemplary embodiment.

FIG. 4 is a flowchart illustrating a method of deriving a boiler combustion model according to an exemplary embodiment.

Referring to FIG. 4, an input/output setting device 510 may set input data and output data required for derivation of a boiler combustion model (operation S100). The input data may include the flow rate, pressure, and temperature of feed water, the flow rate, pressure, and temperature of combustion air, and the dose and composition of fuel. The input data may further include data on coal, data on bias dampers, data on loads, data on secondary air dampers, data on the entire plant, data on overfire air (OFA), data on wind boxes (WB), and data on air. The input/output setting device 510 may set one type of the data or multiple types of the data as input data.

The output data may include the flow rate, pressure, and temperature of steam, the temperature and composition of exhaust gas, and the flow rate and temperature of cooling spray liquid. The output data may further include data on combustion gases, data on loads, data on reheaters, and data on superheaters. The input/output setting device 510 may set one type of the data or multiple types of the data as output data.

A model deriver 520 may derive a boiler combustion model based on the input data and the output data set by the input/output setting device 510 (operation S110). The model deriver 520 may derive a boiler combustion model including an input layer IL configured to receive input data, a hidden layer HL including a plurality of nodes configured to perform computation on the input data, and an output layer OL configured to output the computation result transferred from the hidden layer HL as output data.

Here, the input layer IL may receive input data and transfer the received input data to the hidden layer HL. In this case, the input layer IL may receive input data set by the input/output setting device 510.

The hidden layer HL may receive input data from the input layer IL, calculate a weighted sum, and apply the weighted sum to a function. The hidden layer HL may transmit the results of the operation to the output layer OL.

The output layer OL may receive data from the hidden layer HL and calculate a predictive value by using the results of the operation transferred from the hidden layer HL.

A precision determiner 530 may determine the precision of the derived boiler combustion model (operation S120). If the precision determiner 530 determines that the precision of the derived boiler combustion model is higher than that of a preset precision level, the derived boiler combustion model may be selected as an optimal boiler combustion model. If the precision determiner 530 determines that the precision of the derived boiler combustion model is higher than that of an optimal boiler combustion model stored in the database 540, the derived boiler combustion model is set as an optimal boiler combustion model.

The database 540 may store boiler combustion models derived by the model deriver 520 (operation S130). The database 540 may store optimal models that have been previously determined as the optimal boiler combustion model. The database 540 may store the derived boiler combustion model if the boiler combustion model derived by the model deriver 520 is selected as the optimal boiler combustion model.

Here, the database 540 may store the derived boiler combustion model immediately if the storage space remains. However, if the storage space is insufficient, the database 540 may delete one of the optimal models stored in the database 540 and store the derived boiler combustion model. Here, the database 540 may delete the optimal model having the lowest cumulative precision among the stored optimal models. Alternatively, if the cumulative precision of the optimal model having the lowest optimal model among the optimal models stored in the database 540 is higher than the precision of the derived boiler combustion model, the derived boiler combustion model may not be stored.

As described above, according to the exemplary embodiments, it is possible to implement a boiler combustion model derivation method and a boiler combustion model derivation apparatus which are capable of deriving a boiler combustion model by setting input data and output data and using a combination of mathematical models including an artificial neural network (ANN).

Meanwhile, various methods according to exemplary embodiments described above can be implemented in the form of a readable program through various computer means and recorded in a computer-readable recording medium and executed by a processor.

The recording medium can store a relational database, a non-relational database, an in-memory database, or data that can be accessible directly or indirectly regardless of whether it is in a raw state, a formatted state, an organized state, or an arbitrary accessible state. The recording medium can store other suitable databases such as a database that is distributed among multiple sources and which allows a recording controller to access thereto. In addition, examples of the recording medium may be arbitrary types of storage devices, such as a primary storage device, a secondary storage device, a tertiary storage device, an offline storage device, a volatile storage device, a nonvolatile storage device, a semiconductor storage device, a magnetic storage device, an optical storage device, and a flash storage device, a hard disk drive storage devices, a floppy disk drive, a magnetic tape, or other suitable data storage media.

In the exemplary embodiments, the instructions may be assembler instructions, instruction-set-architecture (ISA) instructions, machine instructions, machine dependent instructions, microcode instructions, firmware instructions, state setting data, or source code or object code instructions written in one or more programming languages, in combination, including object-oriented programing languages, such as Smalltalk, C++, and the like and existing procedural programming languages such as "C" or similar programming languages.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A method of deriving a boiler combustion model of a power plant, the method comprising:
    storing in a database a fixed model for boiler combustion and a plurality of optimal models for boiler combustion, the plurality of optimal models including an optimal model having a lowest cumulative precision among the stored plurality of optimal models, the fixed model having confirmed performance and being generated based on operation data of the power plant collected as long term data over a period of more than one month, the database having a hierarchical structure in which the plurality of optimal models are sequentially stored in respective layers from a highest layer to a lowest layer in the order being determined as an optimal model;
    setting input data and output data required for derivation of a boiler combustion model;
    deriving a boiler combustion model that is trained based on the set input data, the set output data, and a structure of the fixed model, the derived boiler combustion model including
        an input layer configured to receive the input data,
        a hidden layer including multiple nodes configured to perform computation on the input data, and
        an output layer configured to output a computation result as the output data;
    determining a precision of the derived boiler combustion model;
    determining that the derived boiler combustion model is one of the plurality of optimal models stored in the database, if the determined precision of the derived boiler combustion model has a level higher than a preset precision level; and
    setting, as the boiler combustion model of the power plant, the derived boiler combustion model having the level higher than the preset precision level.

2. The method according to claim 1, wherein:
    the input data comprises data indicative of each of a flow rate of feed water, a pressure and a temperature of the feed water, a flow rate of combustion air, a pressure and a temperature of the combustion air, and an amount and a composition of fuel; and
    the input data further comprises data on coal, data on bias dampers, data on loads, data on secondary air dampers, data on an overall plant, data on overfire air (OFA), data on wind boxes (WB), and data on air.

3. The method according to claim 1, wherein:
    the output data comprises data indicative of each of a flow rate of steam, a pressure and a temperature of the steam, a temperature and a composition of exhaust gas, and a flow rate and a temperature of spray liquid for cooling the steam; and
    the output data further comprises data on combustion gas, data on loads, data on reheaters, and data on superheaters.

4. The method according to claim 1, wherein the hidden layer of the boiler combustion model comprises 1 to 30 hidden layers and each of the hidden layers includes 1 to 5000 nodes.

5. The method according to claim 1, wherein:
    the boiler combustion model further comprises a combination of mathematical models including an artificial neural network (ANN);
    the ANN has activation functions including each of a linear function, a step function, a sigmoid function, and a rectified linear unit (ReLU) function; and
    and the mathematical models further comprise a transfer function model, a state space model, and an impulse/step response model.

6. The method according to claim 1, wherein:
    the deriving of the boiler combustion model comprises deriving a network-based (NN-based) boiler combustion model by learning from computational fluid dynamics (CFD) data of the power plant; and
    the NN-based boiler combustion model comprises an input layer including 101 nodes, two hidden layers each of which includes 54 nodes, and an output layer including 264 nodes.

7. The method according to claim 1, wherein:
    the deriving of the boiler combustion model comprises deriving a network-based (NN-based) boiler combustion model by learning from actual grid data of the power plant; and
    the NN-based boiler combustion model comprises an input layer including 116 nodes, four hidden layers each of which includes 15 nodes, and an output layer including 194 nodes.

8. The method according to claim 1, further comprising:
    deleting from the database the optimal model having the lowest cumulative precision among the stored optimal models, if a storage space of the database is insufficient; and storing, after the deleting, the boiler combustion model in the database if the derived boiler combustion model is determined to be the boiler combustion model of the power plant.

9. The method according to claim 8, wherein the boiler combustion model is not stored in the database, if the optimal model having the lowest cumulative precision among the optimal models stored in the database has a higher precision than the determined precision of the derived boiler combustion model.

10. A non-transitory computer readable storage medium storing a computer program comprising instruction for executing the method according to claim 1.

11. An apparatus for deriving a boiler combustion model of a power plant, the apparatus comprising:
- a database configured to store a fixed model for boiler combustion and a plurality of optimal models for boiler combustion, the plurality of optimal models including an optimal model having a lowest cumulative precision among the stored plurality of optimal models, the fixed model having confirmed performance and being generated based on operation data of the power plant collected as long term data over a period of more than one month, the database having a hierarchical structure in which the plurality of optimal models are sequentially stored in respective layers from a highest layer to a lowest layer in the order being determined as an optimal model;
- an input/output setting device configured to set input data and output data required for derivation of a boiler combustion model; and
- at least one processor configured to
  - derive a boiler combustion model that is trained based on the set input data, the set output data, and a structure of the fixed model, the derived boiler combustion model including
    - an input layer configured to receive the input data,
    - a hidden layer including multiple nodes configured to perform computation on the input data, and
    - an output layer configured to output a computation result as the output data; and
  - determine a precision of the derived boiler combustion model,
- wherein the at least one processor further configured to
  - determine that the derived boiler combustion model is one of the plurality of optimal models stored in the database, if a determined precision of the derived boiler combustion model has a level higher than a preset precision level, and
  - set, as the boiler combustion model of the power plant, the derived boiler combustion model having the level higher than the preset precision level.

12. The apparatus according to claim 11,
wherein the input data comprises data indicative of each of a flow rate of feed water, a pressure and a temperature of the feed water, a flow rate of combustion air, a pressure and a temperature of the combustion air, and an amount and a composition of fuel, and
wherein the input data further comprises data on coal, data on bias dampers, data on loads, data on secondary air dampers, data on an overall plant, data on overfire air (OFA), data on wind boxes (WB), and data on air.

13. The apparatus according to claim 11, wherein:
the output data comprises data indicative of each of a flow rate of steam, a pressure and a temperature of the steam, a temperature and a composition of exhaust gas, and a flow rate and a temperature of spray liquid for cooling the steam, and
the output data further comprises data on combustion gas, data on loads, data on reheaters, and data on superheaters.

14. The apparatus according to claim 11, wherein the hidden layer of the boiler combustion model comprises 1 to 30 hidden layers and each of the hidden layers includes 1 to 5000 nodes.

15. The apparatus according to claim 11, wherein:
the boiler combustion model further comprises a combination of mathematical models including an artificial neural network (ANN);
the ANN has activation functions including each of a linear function, a step function, a sigmoid function, and a rectified linear unit (ReLU) function; and
the mathematical models further comprise a transfer function model, a state space model, and an impulse/step response model.

16. The apparatus according to claim 11, wherein:
the at least one processor is further configured to derive a network-based (NN-based) boiler combustion model by learning from computational fluid dynamics (CFD) data of a plant; and
the NN-based boiler combustion model comprises an input layer including 101 nodes, two hidden layers each of which includes 54 nodes, and an output layer including 264 nodes.

17. The apparatus according to claim 11, wherein:
the at least one processor is further configured to derive a network-based (NN-based) boiler combustion model by learning from actual grid data of the power plant; and
the NN-based boiler combustion model comprises an input layer including 116 nodes, four hidden layers each of which includes 15 nodes, and an output layer including 194 nodes.

18. The apparatus according to claim 11, further comprising:
deleting from the database the optimal model having the lowest cumulative precision among the stored optimal models, if a storage space of the database is insufficient; and
storing, after the deleting, the boiler combustion model in the database if the derived boiler combustion model is determined to be the boiler combustion model of the power plant.

19. The apparatus according to claim 18, wherein the boiler combustion model is not stored in the database, if the optimal model having the lowest cumulative precision among the optimal models stored in the database has a higher precision than the determined precision of the derived boiler combustion model.

* * * * *